United States Patent
Sasano et al.

(10) Patent No.: US 10,631,518 B2
(45) Date of Patent: Apr. 28, 2020

(54) ABSORBENT SHEET FOR PETS

(71) Applicant: UNICHARM CORPORATION, Shikokuchuo-shi, Ehime (JP)

(72) Inventors: Yasuhiro Sasano, Kanonji (JP); Yumei Takahashi, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 62 days.

(21) Appl. No.: 15/528,083

(22) PCT Filed: Nov. 13, 2015

(86) PCT No.: PCT/JP2015/081952
§ 371 (c)(1),
(2) Date: May 18, 2017

(87) PCT Pub. No.: WO2016/080301
PCT Pub. Date: May 26, 2016

(65) Prior Publication Data
US 2017/0311564 A1 Nov. 2, 2017

(30) Foreign Application Priority Data
Nov. 19, 2014 (JP) ................. 2014-234940

(51) Int. Cl.
*A01K 1/015* (2006.01)
*A01K 1/01* (2006.01)
(52) U.S. Cl.
CPC .......... *A01K 1/0157* (2013.01); *A01K 1/0107* (2013.01)

(58) Field of Classification Search
CPC .... A01K 1/0157; A01K 1/015; A01K 1/0107; A01K 1/0152; A01K 1/0353
See application file for complete search history.

(56) References Cited

U.S. PATENT DOCUMENTS 8,468,973 B2 * 6/2013 Sasano ................ A01K 1/0157
119/171
9,532,547 B2 * 1/2017 Takahashi ............ A01K 1/0107
(Continued)

FOREIGN PATENT DOCUMENTS

CN 1314188 A 9/2001
CN 102186335 A 9/2011
(Continued)

OTHER PUBLICATIONS

Office Action in JP Application No. 2014-234940, dated Dec. 12, 2017, 8 pp.
(Continued)

*Primary Examiner* — Trinh T Nguyen
(74) *Attorney, Agent, or Firm* — Hauptman Ham, LLP

(57) ABSTRACT

It is possible to provide an absorbent sheet for pets capable of making a trace of excreta of a pet difficult to be visually recognized. The absorbent sheet for pets comprising: a liquid-permeable top sheet; a liquid-impermeable back sheet; an absorbent core provided between the top sheet and the back sheet; a colored area covered with the top sheet and visually recognizable from the top sheet side; and an aroma chemical provided on the top sheet side relative to the absorbent core. L*value of the colored area in an L*a*b*color system is 50 or less. A total light transmittance of the top sheet is in a range of 40 to 80%.

5 Claims, 2 Drawing Sheets

(56) References Cited

U.S. PATENT DOCUMENTS

| | | | | |
|---|---|---|---|---|
| 9,661,826 B2* | 5/2017 | Takagi | ................. | A01K 1/0107 |
| 2005/0005869 A1* | 1/2005 | Fritter | ................. | A01K 1/0152 |
| | | | | 119/173 |
| 2005/0175577 A1* | 8/2005 | Jenkins | ................. | A01K 1/0152 |
| | | | | 424/76.1 |
| 2015/0027380 A1* | 1/2015 | Sasano | ................. | A01K 1/0157 |
| | | | | 119/161 |
| 2015/0320009 A1* | 11/2015 | Sasano | ................. | A01K 1/0107 |
| | | | | 119/161 |

FOREIGN PATENT DOCUMENTS

| | | |
|---|---|---|
| JP | 11-332413 A | 12/1999 |
| JP | 2001-231816 A | 8/2001 |
| JP | 2006-238745 A | 9/2006 |
| JP | 2010-51261 A | 3/2010 |
| JP | 2011-55758 A | 3/2011 |
| JP | 2012-29612 A | 2/2012 |
| JP | 2012-130285 A | 7/2012 |
| JP | 2014-14304 A | 1/2014 |
| JP | 2014-68591 A | 4/2014 |
| JP | 2014-117177 A | 6/2014 |
| JP | 2014-117185 A | 6/2014 |
| JP | 5593434 B1 | 9/2014 |
| WO | 02/30365 A1 | 4/2002 |

OTHER PUBLICATIONS

Extended European Search Report in EP Application No. 15860673.1, dated Oct. 11, 2017, 8 pp.

International Search Report in PCT/JP2015/081952, dated Dec. 8, 2015.

International Search Report in PCT/JP2014/082476, dated Jan. 27, 2015, 4pp.

Office Action in JP Application No. 2014-234899, dated Jan. 27, 2015, 6pp.

Office Action in U.S. Appl. No. 15/528,082, dated Dec. 31, 2018, 18pp.

Office Action in TW Application No. 104136504, dated Apr. 24, 2019, 25pp.

Office Action in TW Application No. 104137739, dated Mar. 7, 2019, 13pp.

Office Action in CN Application No. 201480083515.0, dated Aug. 26, 2019, 16pp.

Office Action in CN Application No. 201580063366.6, dated Oct. 16, 2019, 16pp.

* cited by examiner

ABSORBENT SHEET FOR PETS

RELATED APPLICATIONS

The present application is a national phase of International Application Number PCT/JP2015/081952, filed Nov. 13, 2015, which claims priority to Japanese Application Number 2014-234940, filed Nov. 19, 2014.

TECHNICAL FIELD

The present invention relates to an absorbent sheet for pets that absorbs excreta, that is, urine of a pet.

BACKGROUND ART

There is a known absorbent sheet for pets that absorbs excreta, that is, urine of a pet. JP 2006-238745 A (hereinafter referred to as Patent Literature 1) discloses an excreta absorbent sheet for pets capable of exhibiting fragrance effect, deodorant effect, and bactericidal effect. The excreta absorbent sheet for pets disclosed in Patent Literature 1 includes a liquid-impermeable back sheet, a liquid-permeable top sheet, and an absorber positioned between the back sheet and the top sheet. In this absorbent sheet for pets, a chemical liquid containing at least one of a perfume component, a deodorant component, and a bactericidal component is attached to the top sheet.

CITATION LIST

Patent Literature

Patent Literature 1: JP 2006-238745 A

SUMMARY

When a pet excretes excreta on an excreta absorbent sheet for pets once, a trace of the excreta is let on the excreta absorbent sheet for pets. Therefore, even when an odor resulting from the trace of the excreta is removed, a user feels unsanitary by visually recognizing the trace of the excreta. Therefore, even when the deodorant effect is maintained, the user may attempt to replace the excreta absorbent sheet for pets.

The invention has been conceived in view of the above-mentioned problem, and an object of the invention is to provide an absorbent sheet for pets capable of making a trace of excreta of a pet difficult to be visually recognized.

An absorbent sheet for pets according to the present disclosure includes a liquid-permeable top sheet, a liquid-impermeable back sheet, an absorbent core provided between the top sheet and the back sheet, a colored area covered with the top sheet and recognizable from a top sheet side, and an aroma chemical provided on a top sheet side relative to the absorbent core. An L*value of the colored area in an L*a*b*color system is 50 or less. A total light transmittance of the top sheet is in a range of 40 to 80%.

DESCRIPTION OF EMBODIMENTS

Figure 1:
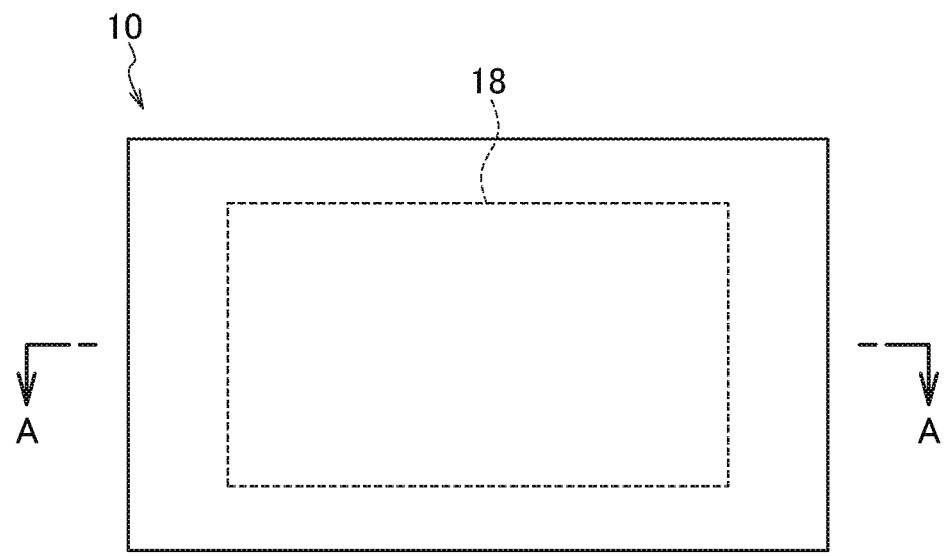
FIG. 1 is a plan view of an absorbent sheet for pets according to a first embodiment.

Hereinafter, an absorbent sheet for pets according to embodiments will be described with reference to drawings. In description of the drawings below, the same or similar reference numeral will be assigned to the same or similar portion. However, the drawings are schematic, and it should be noted that a ratio of respective dimensions, etc. is different from an actual one. Therefore, specific dimensions, etc. need to be determined by taking the description below into consideration. In addition, a portion in which a relation or a ratio of dimensions is different between drawings may be included.

In this specification, "pets" widely include a vertebrate and an invertebrate, and typically include a pet such as a cat, a dog, a rabbit, a hamster, etc.

(1) Configuration of Absorbent Sheet for Pets

Figure 2:
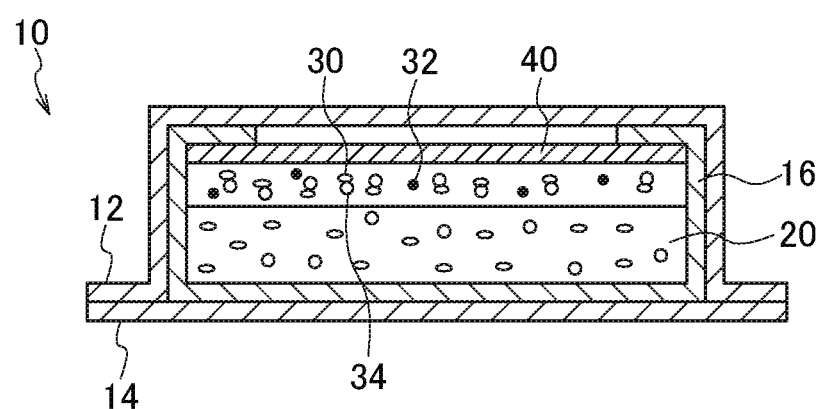
FIG. 2 is a cross-sectional view of the absorbent sheet for pets taken along A-A line illustrated in FIG. 1.

FIG. 1 is a plan view of an absorbent sheet for pets. FIG. 2 is a cross-sectional view of the absorbent sheet for pets taken along A-A line illustrated in FIG. 1. An absorbent sheet for pets 10 is a flat sheet. One surface of the sheet is a surface receiving excreta, and will be also referred to as an "excretion surface". FIG. 1 is a plan view of an absorbent sheet for pets viewed from an excretion surface side.

The absorbent sheet for pets 10 includes a top sheet 12, a back sheet 14, and an absorbent core 20. The absorbent core 20 is provided between the top sheet 12 and the back sheet 14.

The top sheet 12 is a liquid-permeable sheet that allows a liquid such as excreta of a pet to permeate the sheet. For example, air-through nonwoven fabric may be used as the top sheet 12. However, the top sheet 12 is not particularly restricted. The back sheet 14 is a liquid-impermeable sheet into which a liquid such as excreta of the pet does not permeate. For example, a resin film sheet may be used as the back sheet 14. However, the back sheet 14 is not particularly restricted.

The absorbent core 20 includes a pulp and an absorbent material. Examples of the absorbent material include a hydrophilic fiber, a super absorbent polymer, or a combination thereof. The absorbent core 20 has a water-holding capacity of 1,000 g/m$^2$ or more, preferably 2,000 g/m$^2$ or more, and the amount of water seeping from the absorbent core 20 having absorbed 40 mL of water after three minutes is 10 g or less, preferably 5 g or less.

The absorbent core 20 may be wound around core wrap 16. For example, the core wrap 16 may be formed from tissue. At least one cover layer 40 may be provided between the top sheet 12 and the absorbent core 20. The cover layer 40 may be formed from tissue or SMS nonwoven fabric.

In an embodiment illustrated in FIG. 2, one cover layer 40 is illustrated. When the cover layer 40 is formed from tissue, the cover layer 40 warps around the absorbent core 20 together with the core wrap 16.

The super absorbent polymer 34 may be provided on the top sheet 12 side relative to the absorbent core 20. Preferably, this super absorbent polymer 34 is provided between the absorbent core 20 and the top sheet 12. More preferably, the super absorbent polymer 34 is provided between the absorbent core 20 and the cover layer 40.

Preferably, an absorption rate of the absorbent material provided in the absorbent core 20 is higher than an absorption rate of the super absorbent polymer 34 provided on the top sheet 12 side of the absorbent core 20. As an example, the absorption rate of the absorbent material in the absorbent core 20 is less than 18 seconds. In this specification, the "absorption rate" means a water absorption rate measured by a vortex method.

An antimicrobial and/or a bacteriostat 30 may be provided on the top sheet 12 side relative to the absorbent core 20. Preferably, the antimicrobial and/or the bacteriostat 30 is provided on the absorbent core 20 side relative to the top sheet 12. The cover layer 40 is preferably provided between the top sheet 12 and the antimicrobial and/or the bacteriostat 30.

Preferably, the antimicrobial and/or the bacteriostat 30 is in a powder form. More preferably, the antimicrobial and/or the bacteriostat 30 may be formed from a powdery inorganic substance. Further, the powdery antimicrobial and/or the bacteriostat 30 may be attached to a surface of the super absorbent polymer 34 provided on the top sheet 12 side relative to the absorbent core 20.

The antimicrobial may be an organic antimicrobial such as quaternary ammonium salt, p-oxybenzoic acid ester, etc. Alternatively, the antimicrobial may be an inorganic antimicrobial containing an inorganic substance such as Ag, Mn, Fe, Co, Ni, Cu, Zn, etc. Instead, the antimicrobial may be an antibacterial substance containing a natural material such as a tea leave, a coffee extraction residue, etc. The bacteriostat may be a bacteriostatic substance such as organic acid, organic acid salt, etc. In addition, the antibacterial substance or the bacteriostatic substance exemplified above may be mixed with each other.

The absorbent sheet for pets 10 may include an aroma chemical 32 provided on the top sheet 12 side relative to the absorbent core 20. The aroma chemical 32 may be provided between the cover layer 40 and the absorbent core 20.

Preferably, the aroma chemical 32 is included in cyclodextrin. More preferably, the cyclodextrin is solidified by a binder. Examples of the binder include gum arabic, dextrose, glycerin, etc. A particle diameter of a particle obtained by combining the cyclodextrin and the binder is preferably 30 μm or more.

The cyclodextrin may correspond to an arbitrary type such as α*-cyclodextrin, β-cyclodextrin, etc. The cyclodextrin included in the aroma chemical 32 may be water-soluble.

In the present embodiment, the antimicrobial and/or the bacteriostat 30 and the aroma chemical 32 are provided in the same layer. The invention is not restricted thereto, and the absorbent sheet for pets may have the antimicrobial and/or the bacteriostat 30 and the aroma chemical 32 in different layers. In addition, according to an embodiment, the absorbent sheet for pets may include at least one of the antimicrobial, the bacteriostat, and the aroma chemical.

Figure 3:
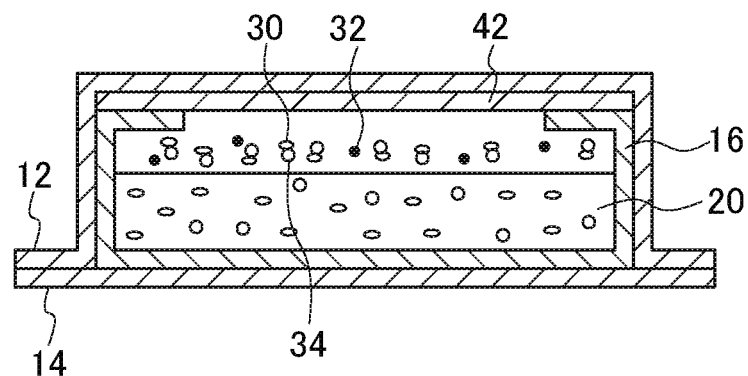
FIG. 3 is a cross-sectional view of an absorbent sheet for pets according to a second embodiment.

FIG. 3 is a cross-sectional view of an absorbent sheet for pets according to a second embodiment. The same or similar reference numeral is assigned to the same or similar component as that of the first embodiment. Similarly to the first embodiment, the absorbent sheet for pets according to the second embodiment includes a top sheet 12, a back sheet 14, an absorbent core 20, core wrap 16, the antimicrobial and/or the bacteriostat 30, and an aroma chemical 32.

In the second embodiment, the absorbent sheet for pets includes a cover layer 42 provided on the absorbent core 20 side relative to the top sheet 12. The cover layer 42 is disposed on an excretion surface side relative to the core wrap 16. The cover layer 42 may be formed from tissue or nonwoven fabric. Preferably, the cover layer 42 is formed from SMS nonwoven fabric.

Figure 4:
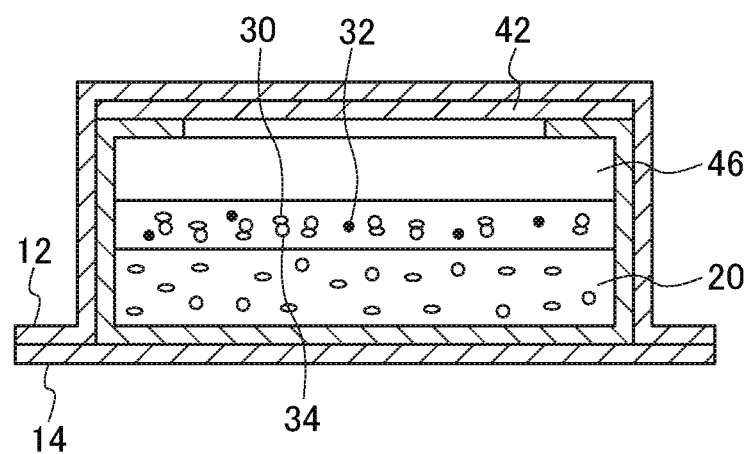
FIG. 4 is a cross-sectional view of an absorbent sheet for pets according to a third embodiment.

FIG. 4 is a cross-sectional view of an absorbent sheet for pets according to a third embodiment. The same or similar reference numeral is assigned to the same or similar component as that of the first embodiment. Similarly to the first embodiment, the absorbent sheet for pets according to the third embodiment includes a top sheet 12, a back sheet 14, an absorbent core 20, core wrap 16, an antimicrobial and/or a bacteriostat 30, and an aroma chemical 32.

In the third embodiment, in the absorbent sheet for pets, a cover layer 42 and a pulp material 46 are provided between the antimicrobial and/or the bacteriostat 30 or the aroma chemical 32 and the top sheet 12. The cover layer 42 may be formed from tissue or nonwoven fabric. The cover layer 42 may be disposed on an excretion surface side relative to the pulp material 46, or the pulp material 46 may be disposed on an excretion surface side relative to the cover layer 42.

The pulp material 46 is wrapped with the core wrap 16 together with the absorbent core 20. The pulp material 46 allows pet excreta to rapidly permeate the pulp material 46 toward the absorbent core 20. In this way, drying of the top sheet 12 may be promoted after the pet excretes excreta.

In the first to third embodiments, only one cover layer 40 or 42 is illustrated. Alternatively, the absorbent sheet for pets may have a plurality of cover layers.

In the first to third embodiments, the absorbent sheet for pets 10 has a colored area 18 visually recognizable from the top sheet 12 side. The colored area 18 may be formed on the top sheet 12. Instead, the colored area 18 may be formed in the cover layer 40 or 42 provided on the absorbent core 20 side relative to the top sheet 12. Alternatively, the colored area 18 may be formed in the absorbent core 20.

Preferably, the colored area 18 is formed on the absorbent core 20 side relative to the top sheet 12, and the top sheet 12 covers the colored area 18. In this case, total light transmittance of the top sheet 12 is preferably in a range of 40 to 80%, and an L*value of the colored area 18 in an L*a*b*color system is preferably 50 or less. Here, the total light transmittance may be measured by a test method according to JIS K 7105.

The L*value of the L*a*b*color system less than or equal to 50 indicates a so-called dark color. A dark color system absorbs a color due to liquid excreta, and thus makes the excreta inconspicuous. The total light transmittance of the top sheet 12 may be appropriately adjusted depending on a thickness of the top sheet 12, a material forming the top sheet 12, fiber density of a synthetic fiber forming the top sheet 12, etc.

(2) Action and Effect

In the absorbent sheet for pets 10 according to the above-described embodiments, an odor of water failing to be absorbed into the absorbent core 20 or an odor of excreta attached to the material such as the nonwoven fabric included in the absorbent sheet for pets 10 may be removed or turned into a fragrance for a long time by the aroma chemical 32 provided on the top sheet 12 side relative to the absorbent core 20. In addition, since the L*value of the colored area 18 is 50 or less, a trace of the wet absorbent core 20, that is, a trace of excreta is concealed. In addition, concealment of the trace of excreta is improved by decreasing the total light transmittance of the top sheet 12. In this way, the user rarely visually recognizes a trace of excreta attached to the absorbent sheet for pets 10, thereby suppressing an impulse to replace the absorbent sheet for pets 10. In this way, since the trace of excreta is concealed, the user may use the absorbent sheet for pets 10 for a long time without causing great discomfort. Further, even though the colored area 18 having a low L*value may give a strong impact on human vision, the presence of the colored area 18 may be reduced since the top sheet 12 having a low total light transmittance covers the colored area 18.

According to an embodiment, since the aroma chemical 32 is disposed to be interposed between the cover layer 40 or 42 and the absorbent core 20, a controlled release effect of the aroma chemical 32 may be enhanced.

According to an embodiment, the aroma chemical 32 is included in the cyclodextrin (clathrate). A deodorant or fragrance effect by the aroma chemical 32 may be maintained for a long time due to the controlled release effect of the aroma chemical of the cyclodextrin. In addition, since the aroma chemical 32 included in the cyclodextrin is released by water, more aroma chemical 32 is released when excreta is attached to the absorbent sheet for pets 10. Therefore, the user may recognize that the pet has voided excreta by an odor of the aroma chemical 32.

According to an embodiment, the cyclodextrin is solidified by the binder. A particle size of a bonded particle obtained by bonding the cyclodextrin and the binder together is increased by the binder. In this way, the bonded particle is less likely to pass through the top sheet 12 or the cover layer 40 or 42. Therefore, it is possible to suppress loss of the cyclodextrin and the aroma chemical 32 during manufacture or use of the absorbent sheet for pets 10. In this way, it is possible to improve cost efficiency at the time of manufacture and maintain the deodorant or fragrance effect for a long time.

According to an embodiment, the absorbent core 20 has the water-holding capacity of 1,000 $g/m^2$ or more, preferably 2,000 $g/m^2$ or more, and the amount of water seeping from the absorbent core 20 having absorbed 40 mL of water after three minutes is 10 g or less, preferably 5 g or less. In this way, it is possible to increase the amount of water absorbed into the absorbent core 20, and to reduce water failing to be absorbed into the absorbent core 20 or water seeping from the absorbent core 20 after being absorbed into the absorbent core 20 once as much as possible. In this way, it is possible to suppress decay of the absorbent sheet for pets 10 or microbial breeding. In addition, even when a trace of excreta is present, a state in which the absorbent sheet for pets 10 is not wet is maintained. For this reason, the absorbent sheet for pets 10 may be used a plurality of number of times without the pet having a dislike. In addition, diffusion of excreta in the absorbent core 20 is prevented by increasing the water-holding capacity of the absorbent core 20. In this way, even when excreta adheres to the absorbent sheet for pets 10 once, an area in which a trace of the excreta is not attached increases. As a result, the absorbent sheet for pets 10 may be used a plurality of number of times. Further, when water failing to be absorbed into the absorbent core 20 or water seeping from the absorbent core 20 after being absorbed into the absorbent core 20 once is reduced as much as possible, rapid release of the aroma chemical 32 may be suppressed, and the deodorant or fragrance effect may be exhibited for a long time.

According to an embodiment, the absorbent sheet for pets 10 includes the super absorbent polymer 34 provided on the top sheet 12 side relative to the absorbent core 20. The super absorbent polymer 34 may absorb water failing to be retained by the absorbent core 20 or water seeping from the absorbent core 20. As a result, even when the absorbent sheet for pets 10 is used for a long time, microbial breeding is prevented, and decay or an odor of the absorbent sheet for pets 10 may be suppressed.

According to an embodiment, the absorption rate of the absorbent material provided in the absorbent core 20 is higher than the absorption rate of the super absorbent polymer 34. Excreta may be absorbed into the absorbent core 20 as much as possible by lowering the absorption rate of the super absorbent polymer 34 provided on the top sheet 12 side of the absorbent core 20. In addition, urine may be rapidly retained, and diffusion of urine may be suppressed by increasing the absorption rate of the absorbent material provided in the absorbent core 20. In this way, even when urine adheres to the absorbent sheet for pets 10 once, an area in which a trace of the urine is not attached increases. As a result, the absorbent sheet for pets 10 may be used a plurality of number of times. In addition, when diffusion of urine is suppressed, the amount of cyclodextrin not touching urine increases. In this way, the aroma chemical 32 present in an area not touched by urine is maintained in a state in which the aroma chemical 32 is wrapped with the cyclodextrin for a long time. As a result, the deodorant or fragrance effect may be maintained for a long time.

According to an embodiment, the antimicrobial and/or the bacteriostat 30 provided on the top sheet 12 side relative to the absorbent core 20 is provided. Even when the absorbent sheet for pets 10 is used for a long time, the antimicrobial and/or the bacteriostat 30 may suppress decay of the excretion part. In particular, since the antimicrobial and/or the bacteriostat 30 is provided on the top sheet 12 side relative to the absorbent core 20, urine of the pet passes through the antimicrobial and/or the bacteriostat 30 before arriving at the absorbent core 20. In this way, the urine of the pet more reliably touches the antimicrobial and/or the bacteriostat 30, and thus an effect of suppressing decay of excreta is improved.

According to an embodiment, the powdery antimicrobial and/or bacteriostat 30 attached to the surface of the super absorbent polymer 34 is included. Since the antimicrobial and/or the bacteriostat 30 is attached to the surface of the super absorbent polymer 34, the antimicrobial and/or the bacteriostat 30 may be easily and uniformly dispersed on the absorbent core 20 even when the amount of the antimicrobial and/or the bacteriostat 30 is small. Further, when the absorbent sheet for pets 10 is manufactured, a process of separately scattering the super absorbent polymer 34 and the antimicrobial and/or the bacteriostat 30 is unnecessary, and the antimicrobial and/or the bacteriostat 30 may be scattered simultaneously with the super absorbent polymer 34. In this way, it is possible to easily manufacture the absorbent sheet for pets 10 including the super absorbent polymer 34 and the antimicrobial and/or the bacteriostat 30 on the absorbent core 20. Further, since the antimicrobial and/or the bacteriostat 30 is in the powder form rather than a liquid form, the antimicrobial and/or the bacteriostat 30 may be inhibited from seeping up to the top sheet 12 even when load is applied to the absorbent sheet for pets 10. In this way, irritation to the pet due to the antimicrobial and/or the bacteriostat 30 may be further reduced.

Although the invention has been described in detail with reference to the above embodiments, it will be apparent to those skilled in the art that the invention is not limited to the embodiments described this specification. The invention may be implemented as modifications and modifications without departing from the spirit and scope of the invention as defined by the scope of the claims. Accordingly, the description of the specification is for the purpose of illustration and does not have any restrictive meaning to the invention.

Then entire contents of Japanese Patent Applications No. 2014-234940 (filed on Nov. 19, 2014) are incorporated in this specification by reference.

INDUSTRIAL APPLICABILITY

According to the invention, it is possible to provide an absorbent sheet for pets capable of making a trace of excreta of a pet difficult to be visually recognized.

REFERENCE SIGNS LIST

10 . . . absorbent sheet for pets
12 . . . top sheet
14 . . . back sheet
16 . . . core wrap
18 . . . colored area
20 . . . absorbent core
30 . . . antimicrobial and/or bacteriostat
32 . . . aroma chemical
34 . . . super absorbent polymer
40 . . . cover layer
42 . . . cover layer
46 . . . pulp material

The invention claimed is:

1. An absorbent sheet for pets, comprising:
   a liquid-permeable top sheet;
   a liquid-impermeable back sheet;
   an absorbent core provided between the top sheet and the back sheet;
   a colored area covered with the top sheet and visually recognizable from the top sheet side;
   an aroma chemical provided on the top sheet side relative to the absorbent core;
   a super absorbent polymer provided on the top sheet side relative to the absorbent core; and
   at least one of an antimicrobial or a bacteriostat in a powder form attached to a surface of the super absorbent polymer,
   wherein
   an L*value of the colored area in an L*a*b*color system is 50 or less,
   a total light transmittance of the top sheet is in a range of 40 to 80%, and
   an absorption rate of an absorbent material provided in the absorbent core is higher than an absorption rate of the super absorbent polymer.

2. The absorbent sheet for pets according to claim 1, further comprising:
   a cover layer provided between the top sheet and the absorbent core,
   wherein the aroma chemical is provided between the cover layer and the absorbent core.

3. The absorbent sheet for pets according to claim 1, wherein the aroma chemical is included in cyclodextrin.

4. The absorbent sheet for pets according to claim 3, wherein the cyclodextrin is solidified by a binder.

5. The absorbent sheet for pets according to claim 1, wherein the absorbent core has a water-holding capacity of 1,000 g/m² or more, and an amount of water seeping from the absorbent core having absorbed 40 mL of water is 10 g or less after three minutes.

* * * * *